(12) United States Patent
Lin (10) Patent No.: US 6,585,087 B2
(45) Date of Patent: Jul. 1, 2003

(54) CONTROL MECHANISM FOR USE IN MAGNETICALLY OPERATED WHEELS

(75) Inventor: Wan-Tzu Lin, Taichung (TW)

(73) Assignee: Yuan Ho Chuen Co., Ltd. (TW)

( * ) Notice: Subject to any disclaimer, the term of this patent is extended or adjusted under 35 U.S.C. 154(b) by 0 days.

(21) Appl. No.: 09/975,153

(22) Filed: Oct. 12, 2001

(65) Prior Publication Data

US 2003/0070889 A1 Apr. 17, 2003

(51) Int. Cl.[7] .................................................. B60L 7/00
(52) U.S. Cl. ..................................... 188/164; 188/79.56
(58) Field of Search ........................ 188/74, 78, 79.56, 188/79.61, 161, 162, 164; 192/84.6, 20

(56) References Cited

U.S. PATENT DOCUMENTS

| | | | | |
|---|---|---|---|---|
| 1,729,841 A | * | 10/1929 | Noble .......................... | 188/152 |
| 1,757,348 A | * | 5/1930 | Van Buskirk ............. | 188/79.61 |
| 1,758,139 A | * | 5/1930 | Blackmore .............. | 188/140 R |
| 2,002,139 A | * | 5/1935 | Rosiers ....................... | 116/208 |
| 3,613,356 A | * | 10/1971 | Woodward .............. | 188/106 P |
| 4,807,828 A | * | 2/1989 | Yamaguchi ................. | 242/223 |
| 5,437,353 A | * | 8/1995 | Wu ............................. | 188/164 |
| 5,711,404 A | * | 1/1998 | Lee ............................. | 188/158 |
| 5,934,433 A | * | 8/1999 | Leimbach et al. ............ | 192/20 |
| 6,360,855 B1 | * | 3/2002 | Szu-Yin ....................... | 188/161 |

* cited by examiner

*Primary Examiner*—Christopher P. Schwartz
*Assistant Examiner*—Xuan Lan Nguyen
(74) *Attorney, Agent, or Firm*—Bacon & Thomas, PLLC (57) ABSTRACT

An improved control mechanism for use in a magnetically operated wheel. The mechanism includes an outer cover, an inner housing, a pair of compression springs, two small supporting wheels, two linkage pieces, an externally connected pull cord control mount, a sensor, a signal transmitter mount and an internal or external transmission set. In adjustment, only a motor is activated to make a main transmission device, a secondary transmission device, a driven gear, a restraint unit and a driving wheel rotate in synchronism. When the driving wheel rotates, a lower gear and the linkage rack of the two pivotal linkage pieces equipped with a plurality of magnets and housed in a flywheel are in mesh engagement with each other to vary the distance between the magnets and the flywheel so as to make the adjustment of braking resistance of the flywheel in a stageless manner.

4 Claims, 10 Drawing Sheets

CONTROL MECHANISM FOR USE IN MAGNETICALLY OPERATED WHEELS

BACKGROUND OF THE INVENTION

The present invention relates to an improved control mechanism for use in a magnetically operated wheel. It mainly is made up of an outer cover, an inner housing, a pair of compression springs, two small supporting wheels, two linkage pieces, an externally connected pull cord control mount, a sensor, a signal transmitter mount and an internal or external transmission set. In adjustment, only a motor is activated to make a main transmission device, a secondary transmission device, a driven gear, a restraint unit and a driving wheel rotate in synchronism. Besides, when the driving wheel rotates, a lower gear and the linkage rack of the two pivotal linkage pieces equipped with a plurality of magnets and housed in a flywheel are in mesh engagement with each other to vary the distance between the magnets and the flywheel so as to make the adjustment of braking resistance of the flywheel in a stageless manner.

People living in a modern society are busy with their work and seldom have time to engage in outdoor physical exercise, so many of them attend indoor health clubs to maintain their physical fitness by means of various types of exercise equipment. Taking an exercise bike for example, it is mainly equipped with a magnetically operated wheel which is made of magnetic material (such as iron) and has a set of magnets housed therein. By way of a closed magnetic field built up between of the magnets and the wheel of magnetic material, a braking resistance is formed to stop the magnetically operated wheel to rotate. Thereby, the variation of the distance between the magnets and the magnetically operated wheel can produce different brake resistance, resulting in generation of various physical exercise level for different people.

Figure 1:
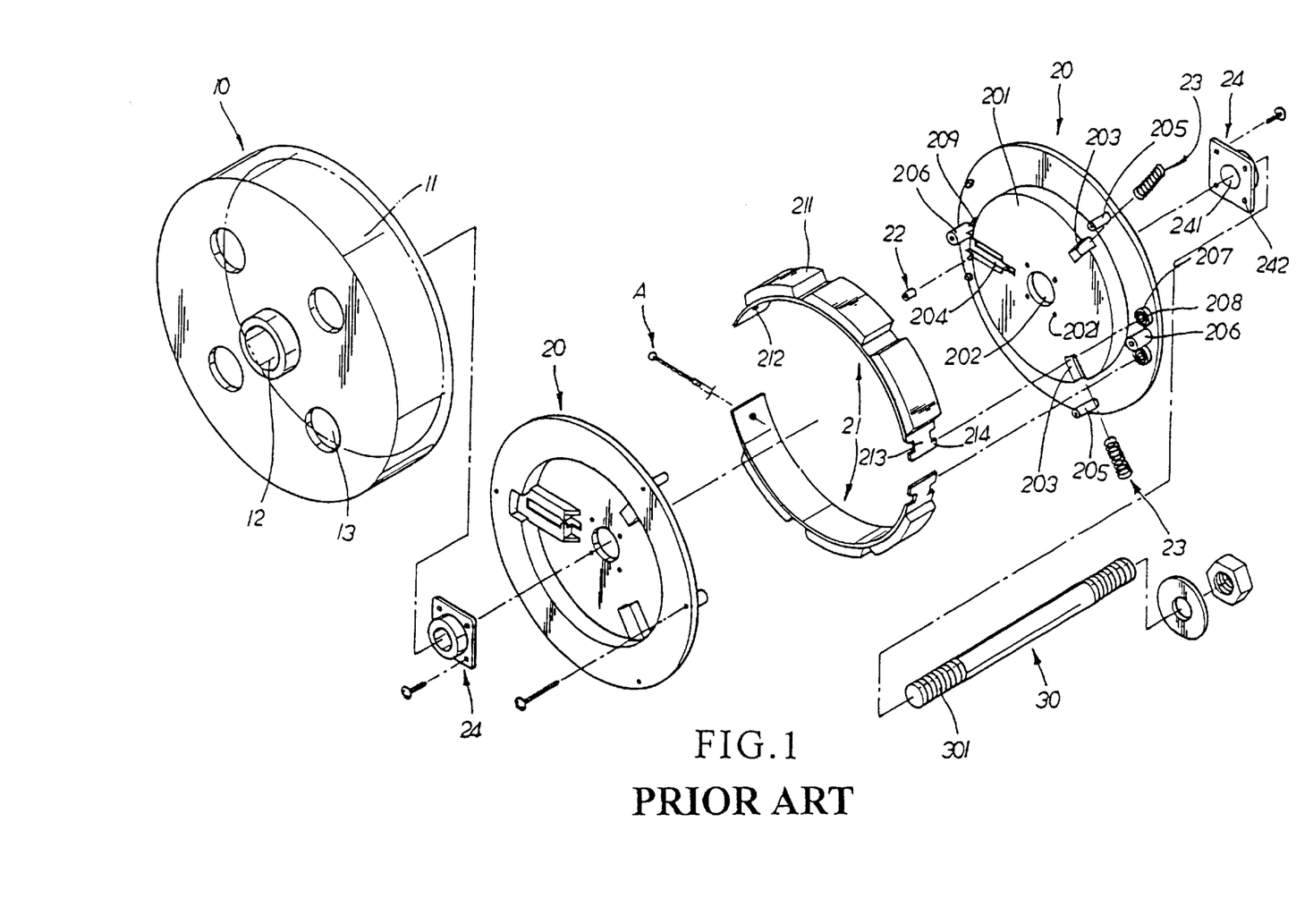
FIG. 1 is a diagram showing the exploded components of a conventional control mechanism of a magnetically operated wheel.

Referring to FIG. 1, a conventional control mechanism of the magnetically operated wheel is illustrated in explosion. It is comprised of a flywheel 10, two inner wheel mounts 20, two brake plates 21, two wire guide rollers 22, two compression springs 23, two positioning seats 24 and a wheel shaft 30. The flywheel 10 has an open-topped chamber 11 with a hollow axle hole 12 defined at the center thereof and four through holes 13 positioned around the central axle hole 12. Each of the inner wheel mounts 20 has a raised platform 201 having a central shaft hole 202 at the center thereof with a pair of rectangular spring receiving chambers 203 and a wire receiving slot 204 on the outer peripheral edge thereof. Adjacent to each spring receiving chamber 203 and on the inner side of the inner wheel mount 20 is disposed a stop post 205. Two symmetric locking posts 206 are located at opposite edges of the wheel mount 20. On both sides of only one of the locking post 206 is disposed a pivot stem 207 each having a hole 208. Next to the other locking post 206 is located a two staged insertion post 209. Around the central shaft hole 202 are disposed four locking holes 2021. Each braking plate 21 is in a curved form with a plurality of magnets 211 secured to the outer surface thereof and has a wire hole 212 at one end and an H-shaped extension unit 213 having a pivot edge 214 smaller than the inner diameter of the hole 208 at the other end. Each positioning seat 24 has a shaft hole 241 at the center with four locking holes 242 on its base board. The wheel shaft 30 has two threaded ends 301.

Figure 2:
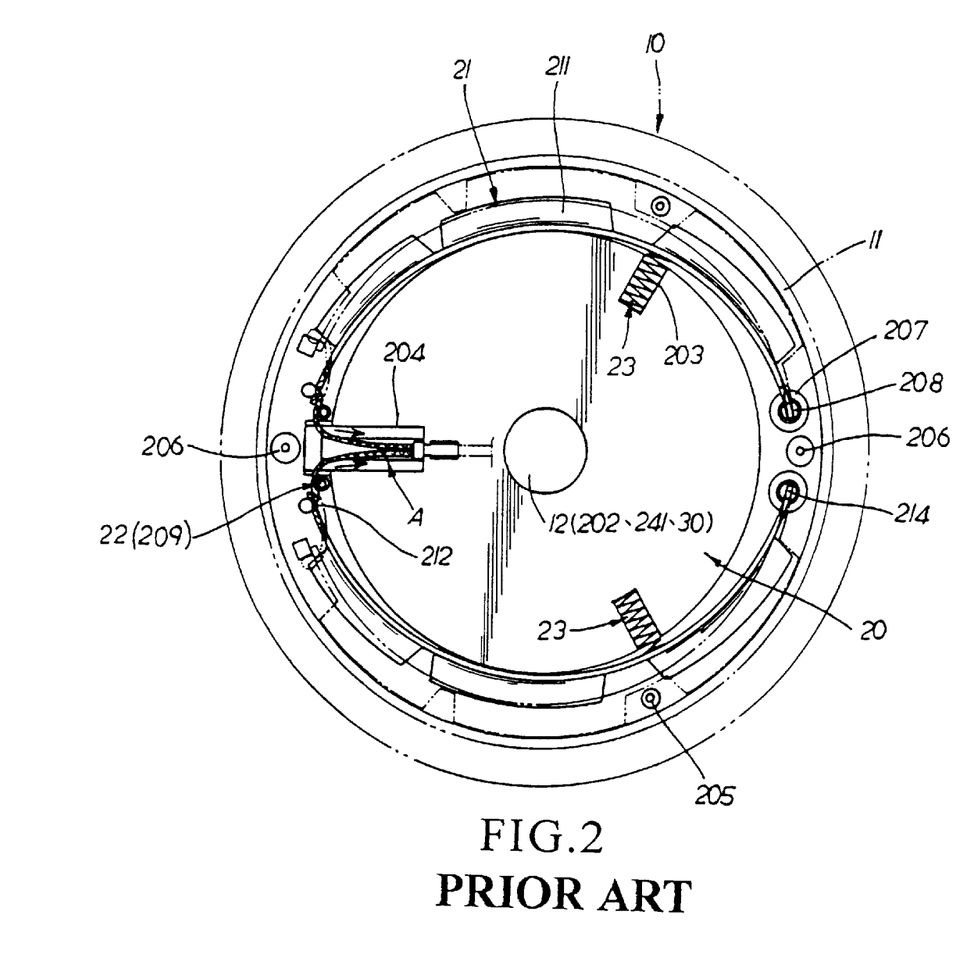
FIG. 2 is a sectional side view of the prior art showing the assembly and operation mode thereof.

The flywheel 10 and the inner wheel mounts 20 are integrally joined together with the brake plates 21 housed between the wheel mounts 20. The positions of the brake plates 21 can be adjusted to vary the brake resistance of the conventional magnetically operated wheel as a result of the variation of the magnetic attraction of the magnets 211 on the flywheel 10. The brake plates controlled by the wire A can be pivoted adjusted as the end of the wire A is pulled outwardly as shown in FIG. 2. Such a prior art structure has a disadvantage in operation. The wire A must be pulled with effort to pivot both the brake plates 21, resulting in easy breaking of the wire A or getting-stuck in operation.

SUMMARY OF THE INVENTION

Therefore, the primary object of the present invention is to provide an improved control mechanism for use in a magnetically operated wheel which drives in linkage the respective wheels by way of a motor so as to permit the magnetically operated wheel not only to be adjusted in a stageless manner without any restraint but also effectively increase the applied force and reduce the resistance by way of a torsion limiting security device and an effort saving level. Even the microcomputer control is out of order, the wheel will not be damaged whereby the magnetically operated wheel can be fully performed to its limit.

DETAILED DESCRIPTION OF THE PREFERRED EMBODIMENTS

There are two embodiments of the present invention that are clearly illustrated in company with the drawings and detailed description.

Figure 3:
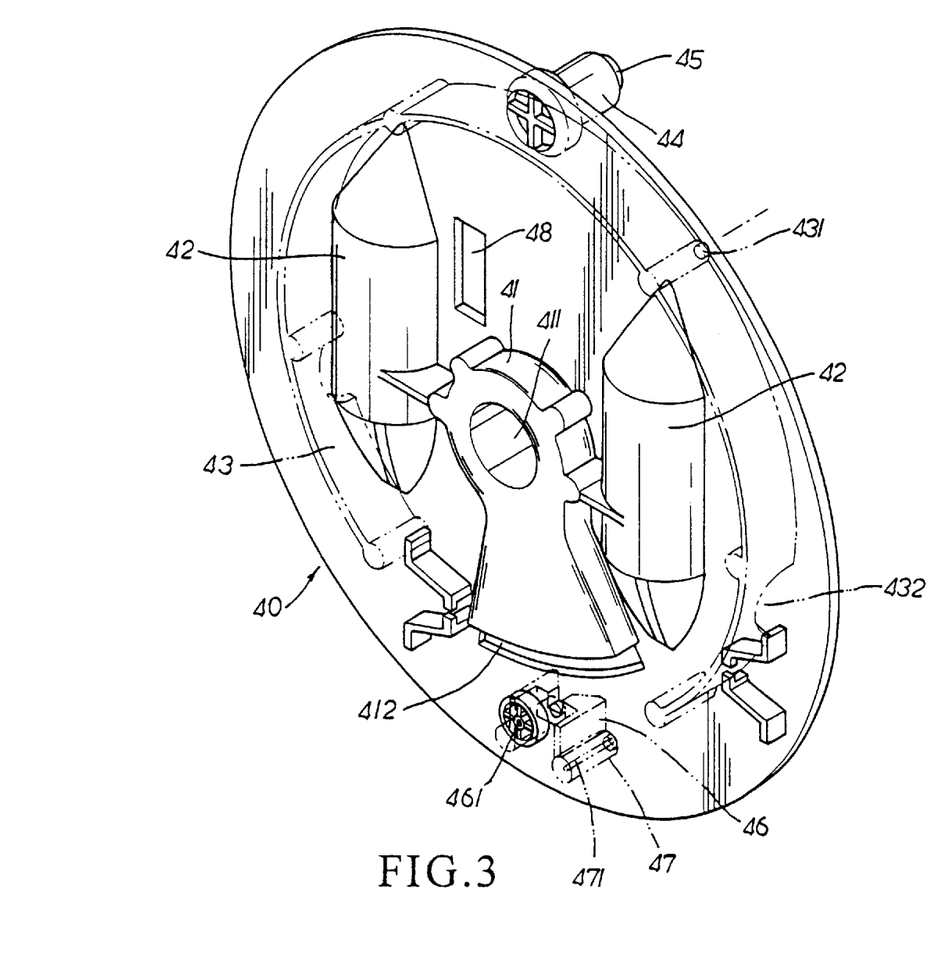
FIG. 3 is a first perspective diagram showing the exploded components of the present invention.
Figure 4:
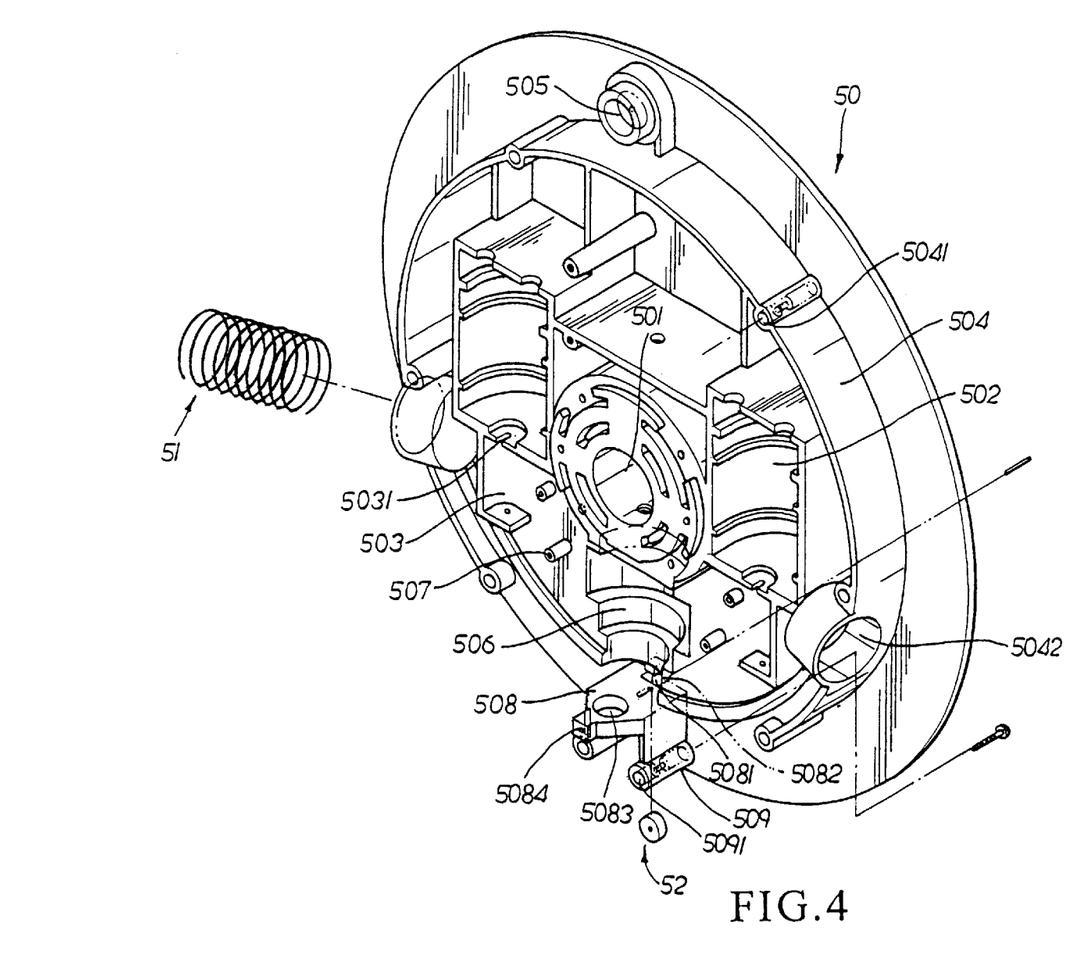
FIG. 4 is a second perspective diagram showing the exploded components of the present invention.
Figure 5:
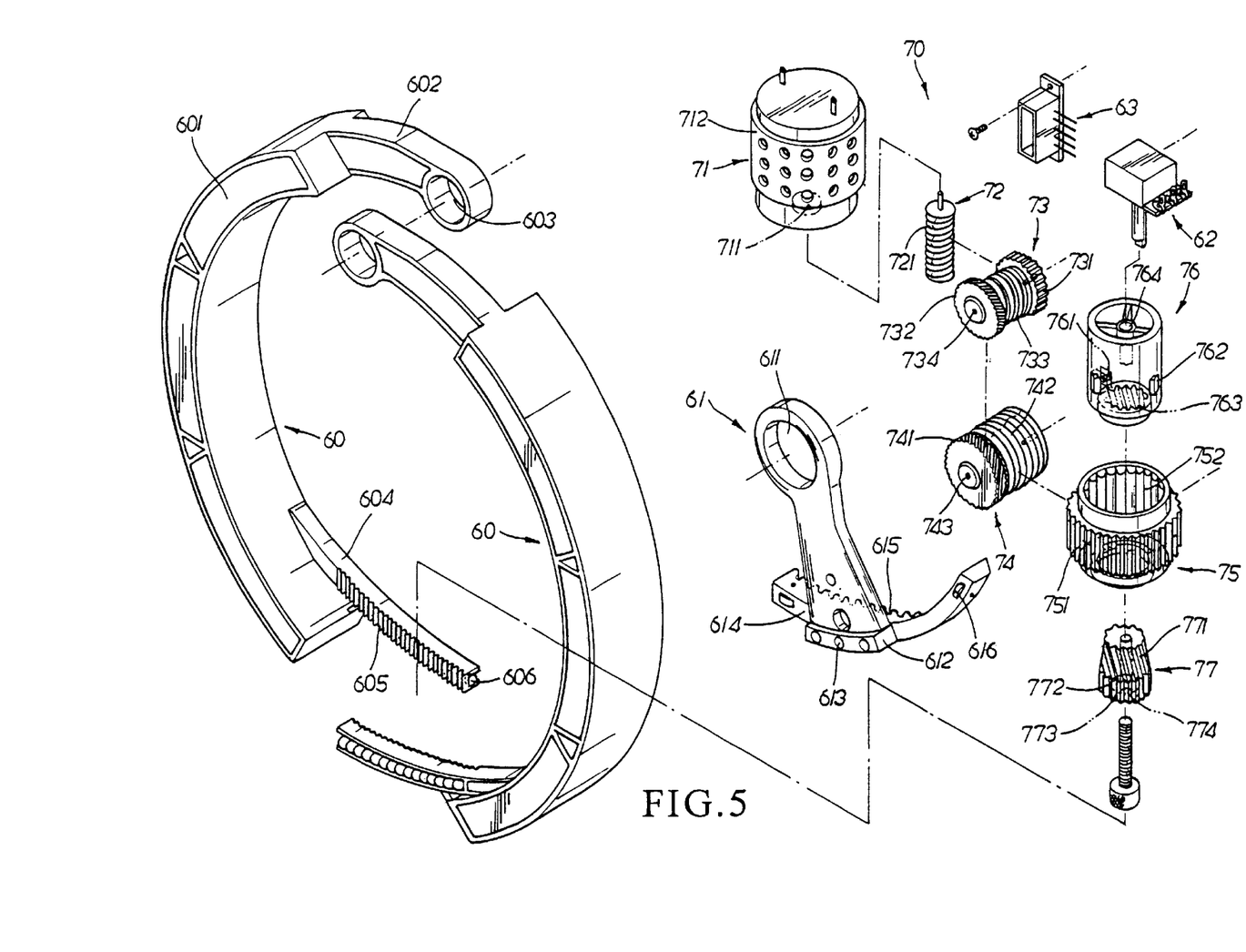
FIG. 5 is a third perspective diagram showing the exploded components of the present invention.

Referring to FIGS. 3, 4, 5, the first embodiment of the present invention is mainly comprised of an outer cover 40, an inner housing 50, a pair of compression springs 51, two small supporting wheels 52, two linkage pieces 60, an externally connected pull cord control mount 61, a sensor 62, a signal transmitter mount 63 and an internal transmission set 70

On the rear side of the outer cover 40 are disposed a pair of symmetrically positioned motor receiving cavities 42 and a control mount receiving cavity 41 which is provided with a shaft hole 411 at the center of the upper portion and a curved slide slot 412 at the bottom thereof. On the periphery of the rear side of the outer cover 40 except the bottom area thereof is disposed a continuous circular reinforcement wall 43 with a plurality of equally spaced posts 431 and a pair of dodge recesses 432 defined thereon. A two-staged post 44 is located at the summit of the rear side with a small-diameter insertion post 45 disposed at the top thereof. At the bottom of the cover 40 is disposed a pivot mount having a wheel-like pivot hole 461. There are two symmetric countersunk posts 47 each having an insertion hole 471. A terminal seat mounting hole 48 is disposed on the rear side of the cover 40.

The inner housing 50 has a central shaft hole 501 with a pair of symmetric motor housing chambers 502 each located at the side thereof. Under each housing chamber 502 is disposed a shaft extension space 503. On the top of each space 503 is disposed a slot 5031. On the periphery except the bottom area of the inner housing 50 is disposed a reinforcement wall 504 with a plurality of equally spaced insertion posts 5041 disposed thereon. Near each end of the reinforcement wall 504 is located a spring housing chamber 5042. An engagement hole 505 having a diameter slightly larger than that of the insertion post 45 of the outer cover 40 is disposed at the summit of the reinforcement wall 504. A countersink cavity 506 is positioned under the central shaft hole 501 with a shaft mounting post 507 disposed at each side thereof. A projected block 508 positioned right under the cavity 506 has a wheel receiving recess 5081 which is provided with a pair of wheel mounting holes 5082 on the front and rear sides thereof. An insertion hole 5083 is located at the front of the projected block 508 and a wheel mounting hole 5084 is defined normal to the insertion hole 5083. A locking post 509 each having a locking hole 5091 is disposed at each side of the underside of the projected block 508.

Referring to FIG. 5, each of the linkage pieces 60 is equipped with a number of magnets 601 thereon with a pivot connector 602 disposed at an upper end having a pivot hole 603. At the lower end of each linkage piece 60 and on an inner edge thereof extends a curved rack 604 having gear teeth 605 of a proper length on one side and a plurality of steel beads 606 on the other side. The externally pull cord control mount 61 has a shaft hole 611 at the top end and a slide limiting block 612 on one side at the bottom end and elongated rack gear 614 having a plurality of gear teeth 615 on the opposite side of the bottom end. A plurality of pull cord holes 613 are disposed on the slide limiting block 612. At each end and on one side of the gear rack gear 614 is disposed a sliding wheel 616.

The internal transmission gear set 70 is made up of a motor 71, a motor shaft 72, a main transmission means 73, a minor transmission means 74, a linkage gear 75, a restraint means 76 and a driving gear 77.

The motor 71 has a shaft mounting hole 711 at the bottom thereof and a plurality of vibration proof muffle holes 712. The peripheral surface of the motor shaft 72 is equipped with a worm gear 721. At one end of the main transmission means 73 is disposed a main gear 731 and at the opposite end is located a bevel gear 732 with a plurality of spirally extended reinforcement ribs 733 placed therebetween. A shaft mounting hole 734 is disposed through the center thereof. The minor transmission means 74 has a bevel gear 741 at one end, corresponding to the bevel gear 732 of the main transmission means 73 and a spirally defined worm gear 742 on the axially extended wall thereof. A shaft mounting hole 743 is disposed at the center of the ends. The linkage gear 75 is provided with an external geared surface 751 with a passage through hole in which are equipped with a plurality of equally spaced retaining grooves 752. The restraint means 76 has 3 equally spaced long cavities on the outer face, in which is embedded a spring 761 and a projected stop block 762. At the bottom of the restraint means 76 is disposed an engagement device 763 and at the top thereof is disposed a rib-supported hollow post 764 at the center.

The driving gear 77 has a flat cone-shaped form top section with a bevel gear 771 disposed externally and a normal driving gear 772 is in connection thereto. At the bottom extends a small insertion post 773 having a locking hole 774 at the center thereof.

Figure 6:
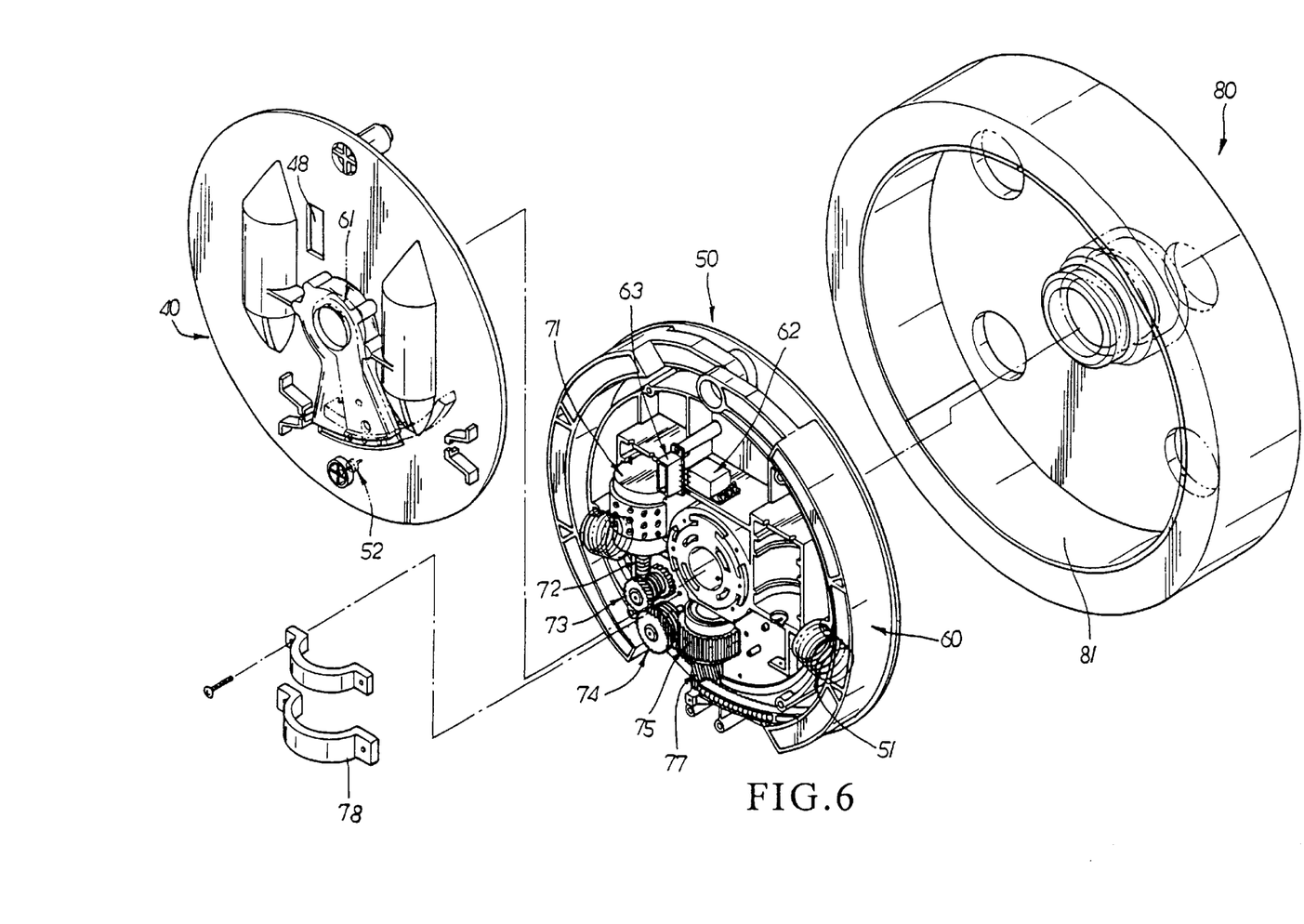
FIG. 6 is a diagram showing the half assembly of the present invention.

In assembly, as shown in FIG. 6, first the small supporting wheel 52 mounted to the inner housing 50 by a shaft located in the wheel mounting hole 5082 is pivotally housed in the wheel receiving recess 5081. At the same time the compression springs 51 are housed in the spring housing chambers 5042 respectively of the inner housing 50. One of the linkage pieces 60 is mounted to the inner housing 50 with the curved rack 604 located at a proper position. Then the restraint means 76 is received in the through hole of the linkage gear 75 with the stop blocks 762 pushed by the springs 761 engaged with the retaining grooves 752 of the linkage gear 75. Next, locking hoops 78 are disposed outside the linkage gear 75. The upper bevel gear 771 of the driving gear 77 is engaged with the engagement device 763 of the restraint means 76 so as to permit the linkage gear 75, the restraint means 76 and the driving gear 77 to rotate in synchronism on the linkage gear 75 being driven.

A bolt led through the locking hole 774 of the driving gear 77 and the hollow post 764 of the restraint means 76 integrates the linkage gear 75, the restraint means 76 and the driving gear 77 that are together mounted onto the projected block 508 of the inner housing 50. The insertion post 773 of the driving gear 77 is registered with the insertion hole 5083 of the projected block 508. The linkage gear 75 can also be housed in the countersink cavity 506.

The lower normal driving gear 772 of the driving gear 77 meshes with the gear teeth 605 of both linkage pieces 60. Afterwards, the motor 71 and the motor shaft 72 are respectively placed in the housing chamber 502 and the shaft extension space 503 of the inner housing 50. The motor shaft 72 passing the slot 5031 is led into the shaft mounting hole 711 of the motor 71 and is in locking engagement with the motor 71. Then, the main and minor transmission means 73, 74 are mounted onto the shaft mounting posts 507 on one side of the inner housing 50 by way of the shaft mounting holes 734, 743 respectively. At the same time, the worm gear 721 of the motor shaft 72 is in engagement with the main gear 731 of the main transmission means 73, and the bevel gear 732 meshes with the bevel gear 741 of the minor transmission means 74 whose spiral worm gear 742 is engaged with the geared surface 751 of the linkage gear 75. In such a manner, the components are in synchronic association with one another mechanically. Moreover, another compression spring 51 and linkage piece 60 are placed in the spring housing chamber 5042 and at a proper position. The gear teeth 605 of the linkage piece 60 mesh with the lower normal gear 772 of the driving gear 77. The driving gear 77 is sandwiched in position between the gear teeth 605 of the linkage pieces 60. At the same time, the sensor 62 and the signal transmitter mount 63 are secured to the upper portion of the central shaft hole 501 of the inner housing 50. The externally connected pull cord control mount 61 is placed in the control mount receiving cavity 41 of the outer cover 40 with its slide limiting block 612 sticking out of the curved slide slot 412. Then another small supporting wheel 52 is mounted onto the outer cover 40 by a shaft one end of which is located in the wheel like pivot hole 461. As the outer cover 40 is engaged with the inner housing 50, the end of the shaft can stick into the wheel mounting hole 5084 of the inner housing 50 so as to make the second small supporting wheel 52 firmly retained in place; and at the same time, the posts 431 register with the insertion posts 5041 of the inner housing 50 and the two staged post 44 registers with the pivot holes 603 of the linkage pieces 60 to pivotally retain the same in position. Besides, the insertion post 45 can register with the engagement hole 505 of the inner housing 50. The rack gear 614 of the externally connected pull cord control mount 61 is at the same time in meshing engagement with the upper bevel gear 771 of the driving gear 77. Then bolts are registered with the insertion holes 471 and the locking holes 5091 of the outer cover 40 and the inner housing 50 to firmly get the same assembled. At final, the assembly of the outer cover and inner housing is housed in the flywheel 80 and fixed in place by shaft and blots.

Moreover, the inner periphery of the flywheel 80 is equipped with a fixed aluminum plate 81 for dividing a magnetic field.

Figure 7:
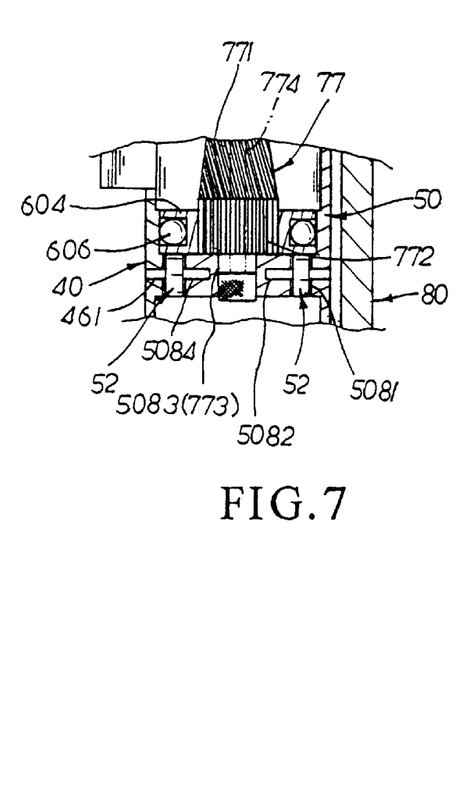
FIG. 7 is a sectional diagram showing the partial structure of the present invention.
Figure 8:
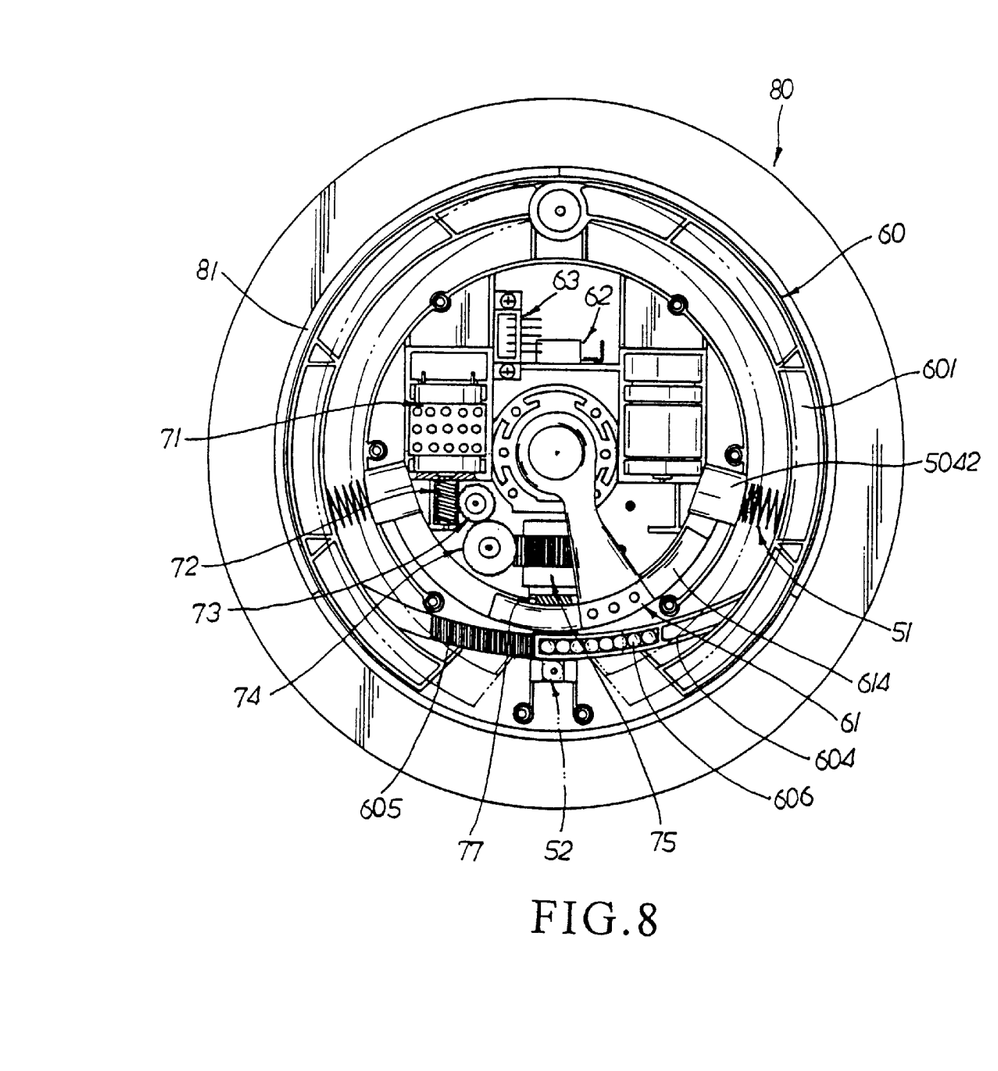
FIG. 8 is a diagram showing the adjustment operation of the present invention.

To adjust the position of the linkage pieces 60 to obtain different braking resistance, as shown in FIG. 7, the motor 71 is actuated to deliver its power via the motor shaft 72 whose worm gear 721 is engaged with the main gear 731 of the main transmission means 73 whereby the main transmission means 73 is rotated in synchronism with the motor shaft 72. The bevel gear 732 of the main transmission means 73 is engaged with the bevel gear 741 of the minor transmission means 74 whose spiral worm gear 742 is engaged with the geared surface 751 of the linkage gear 75 so as to make the minor transmission means 74 and the linkage gear 75 to be synchronically rotated. As the linkage gear 75 rotates, the driving gear 77 is rotated in synchronism by means of the restraint means 76. As the result of the rack gear teeth 605 of the linkage pieces 60 being engaged with the driving gear 77, the linkage pieces 60 are pivoted to move toward or away from each other so as to vary the distance between the magnets 601 and the flywheel 80 to produce different braking resistance. As the linkage pieces 60 are pivoted, the steel beads 606 in rolling engagement with the two small supporting wheels 52 helps the linkage pieces 60 to smoothly pivot.

As the motor 71 continues to rotate to produce an excessive torque due to an abnormal control signal, the spring 761 of the restraint means 76 can not hold the stop blocks 762. The stop blocks 762 will separate from the retaining grooves 752 of the driving gear 75 so as to put the driving gear 75 to freely rotate without any engagement, preventing the linkage pieces 60 from damage at its maximum or minimum operation positions.

In addition, the internal transmission set 70 can be replaced with the driving gear 77 kept and the upper bevel gear 771 still meshed with the gear teeth 615 of the pull cord control mount 61 and the lower normal gear 772 kept in engagement with the rack gear teeth 605 of the linkage pieces 60, and the insertion post 773 located in the insertion hole 5083 of the inner housing 50.

Figure 9:
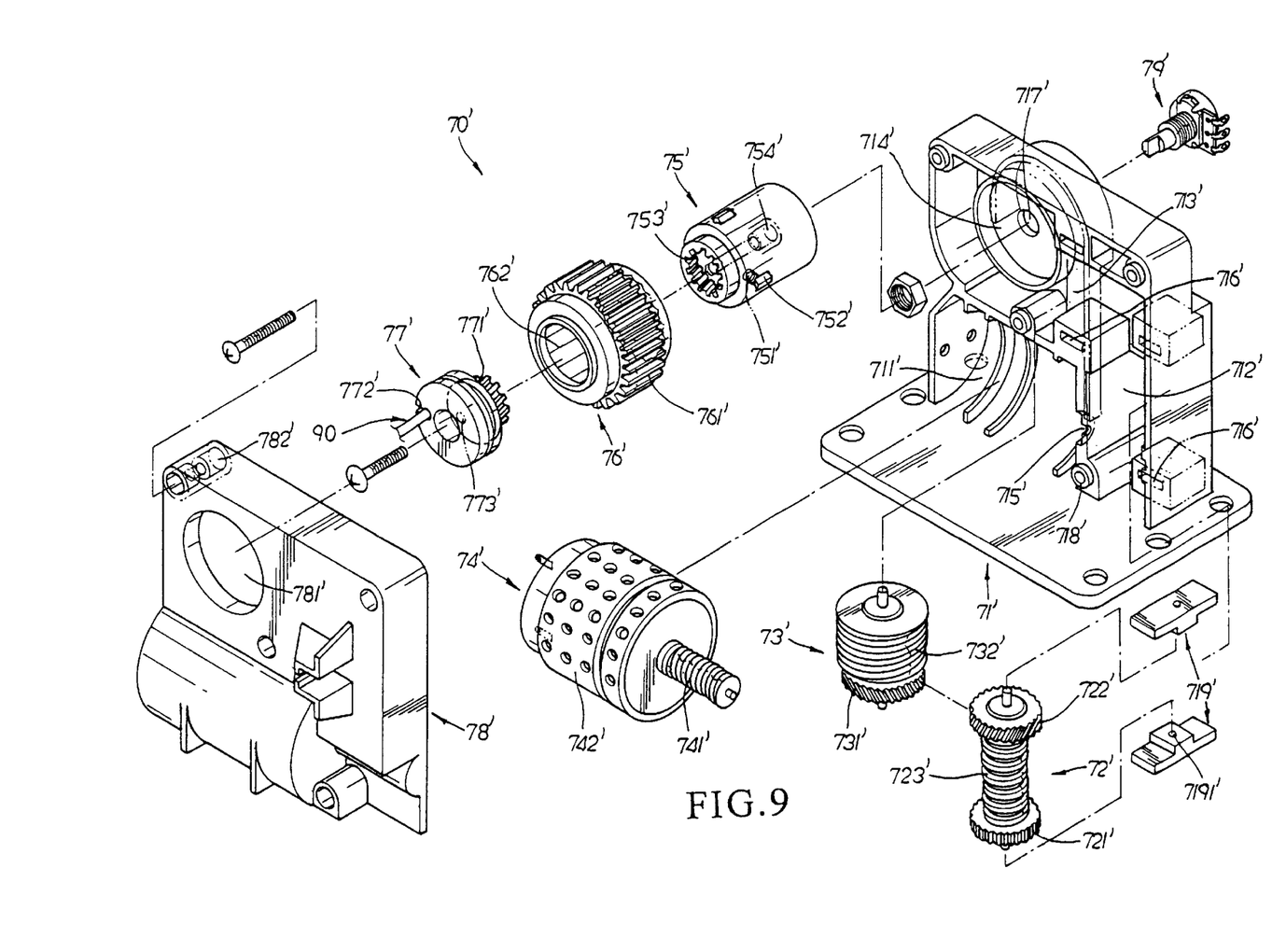
FIG. 9 is a perspective diagram showing the exploded components of another embodiment of the present invention.

Referring to FIG. 9, in the second embodiment, an external transmission set 70' is adopted. The external transmission set 70' is mainly comprised of a housing case 71', four stuff-in blocks 719', a main transmission means 72', a minor transmission means 73', a motor 74', a restraint means 75', a linkage means 76', a driving means 77', an external cover 78' and a sensor 79'.

The housing case 71' has a motor receiving cavity 711', a main transmission means housing cavity 712', a minor transmission means housing cavity 713' and a linkage means housing cavity 714'. On the wall between the motor receiving cavity 711' and the housing cavity 712' is disposed a recess 715' for the passage of the shaft of the motor 74'. At the bottom and top of both the housing cavities 712' and 713' is respectively disposed a slide slot 716', and between the slide slots 716' is opened. At the center of the housing cavity 714' is located a through hole 717'. On the housing case 71' are disposed a plurality of retaining posts 718' and the stuff-in blocks 719' each having an insertion hole 7191'. The main transmission means 72' has a main driving gear 721' at one end and a bevel gear 722' at the other end with a plurality of reinforcement ribs 723' disposed therebetween and an extended rod disposed at each end thereof. The minor transmission means 73' is provided with a secondary bevel gear 731' at one end engaged with the bevel gear 722' of the main transmission means 72' and a spirally extended worm gear 732' on the peripheral surface thereof, and an axially extended rod is disposed at each end thereof.

The motor 74' has an extended motor shaft 741' provided with a worm gear, and a vibration-proof and muffle-like silencer 742' on the external surface thereof. On the outer surface of the restraint means 75' are disposed 3 equally spaced recesses each having a spring 751' and a wedge shaped block 752' housed therein. A teeth-shaped grasping end 753' at the front end of the restraint means 75' with a countersink locking hole 754'. On the surface of the linkage means 76' is disposed a normal gear 761' with a two-staged through hole, a front-large/rear-small hole defined at the center thereof and there are a plurality of equally spaced retaining grooves 762' defined at the large opening end. The driving 72 means 77' has an engagement end 771' with bevel teeth at one end and a pull cord passage recess 772' defined on the periphery edge and a central locking hole 773'. The external cover 78' has an exposure through hole 781' with a number of locking holes 782' at proper positions.

Figure 10:
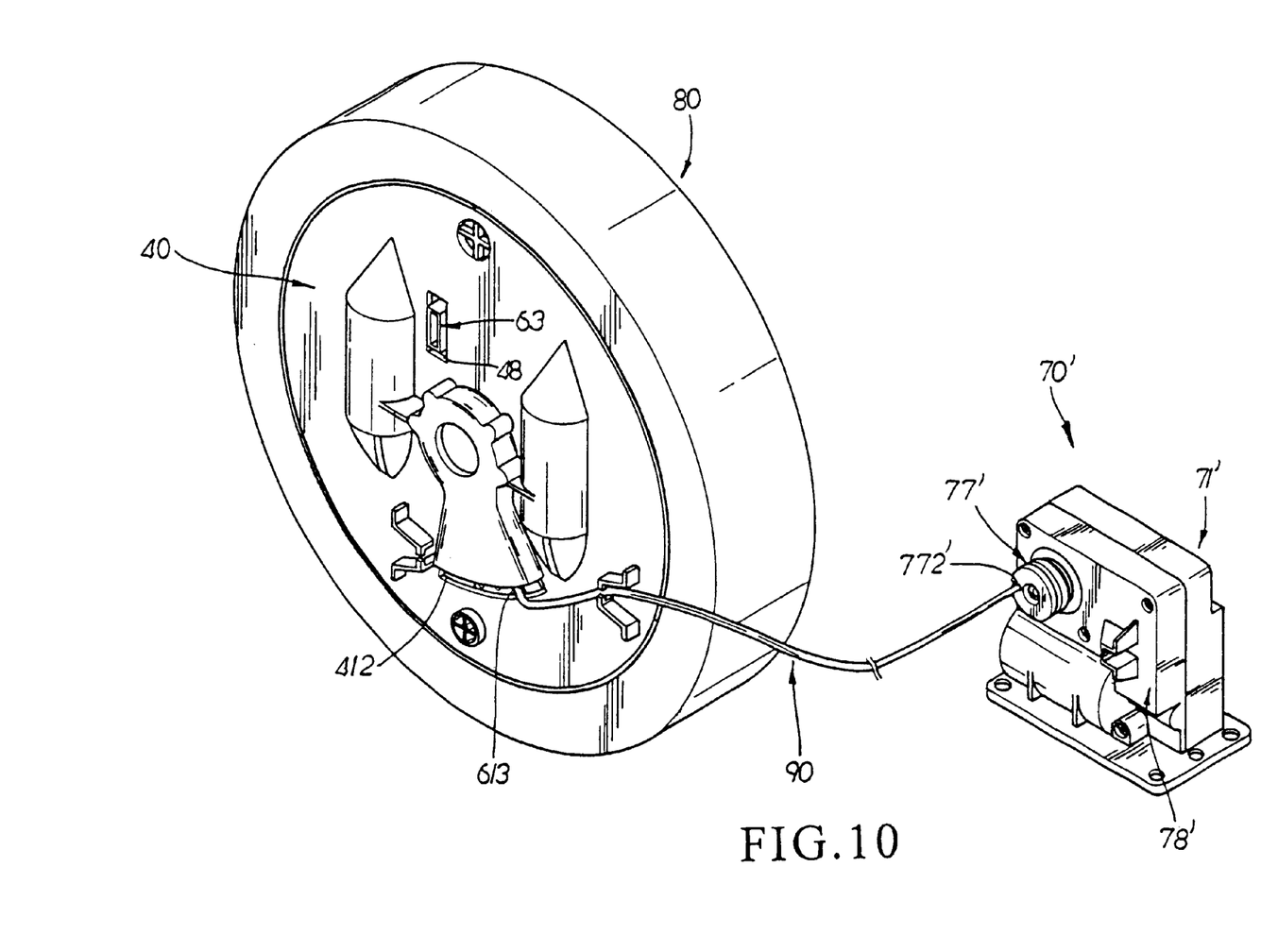
FIG. 10 is a perspective diagram showing the assembly of the embodiment shown in FIG. 9.

In assembly, as shown in FIG. 10, the restraint means 75' is first housed in the linkage means 76' with the grasping end 753' thereof in locking engagement with the engagement end 771' of the driving means 77'. Then a bolt led through the central locking hole 773' of the driving means 77' and the locking hole 754' of the restraint means 75' to get the restraint means 75', the linkage means 76' and the driving means 77' locked together as a whole. Afterwards, the sensor 79' is secured to the through hole 717' by way of a nut. All the restraint means 75', the linkage means 76' and the driving means 77' are housed in the housing cavity 714' of the housing case 71' with the central shaft of the sensor 79' registered with the countersink locking hole 754' of the restraint means 75'. At then the main transmission means 72' and the secondary transmission means 73' are engaged with the stuff-in blocks 719' by way of the central extension rods thereof registering with the respective insertion holes 7191'. The stuff-in blocks 719' are plugged in the slide slots 716' of the housing case 71'. The main transmission means 72' and the secondary transmission means 73' are respectively housed in the housing cavities 712', 713' and the motor 74' is at the same time received in the motor housing cavity 711'. The motor shaft 741' with worm gear is meshed with the main driving gear 721' of the main transmission means 72' whose bevel gear 722' is engaged with the bevel gear 731' of the secondary transmission means 73'; and the spirally extended worm gear 732' of the secondary transmission means 73' is meshed with the normal gear 761' of the linkage means 76'. Afterwards, the external cover 78' is locked into engagement with the housing case 71' as a whole by way of the retaining posts 718' registered with the locking holes 782' of the external cover 78'. Besides, the driving means 77' extends externally via the exposure through hole 781' of the external cover 78', and at last, the ends of the pull cord 90 are respectively led through the pull cord passage recess 772' of the driving means 77' and the pull cord holes 613 of the pull cord control mount 61 to complete the assembly.

Figure 11:
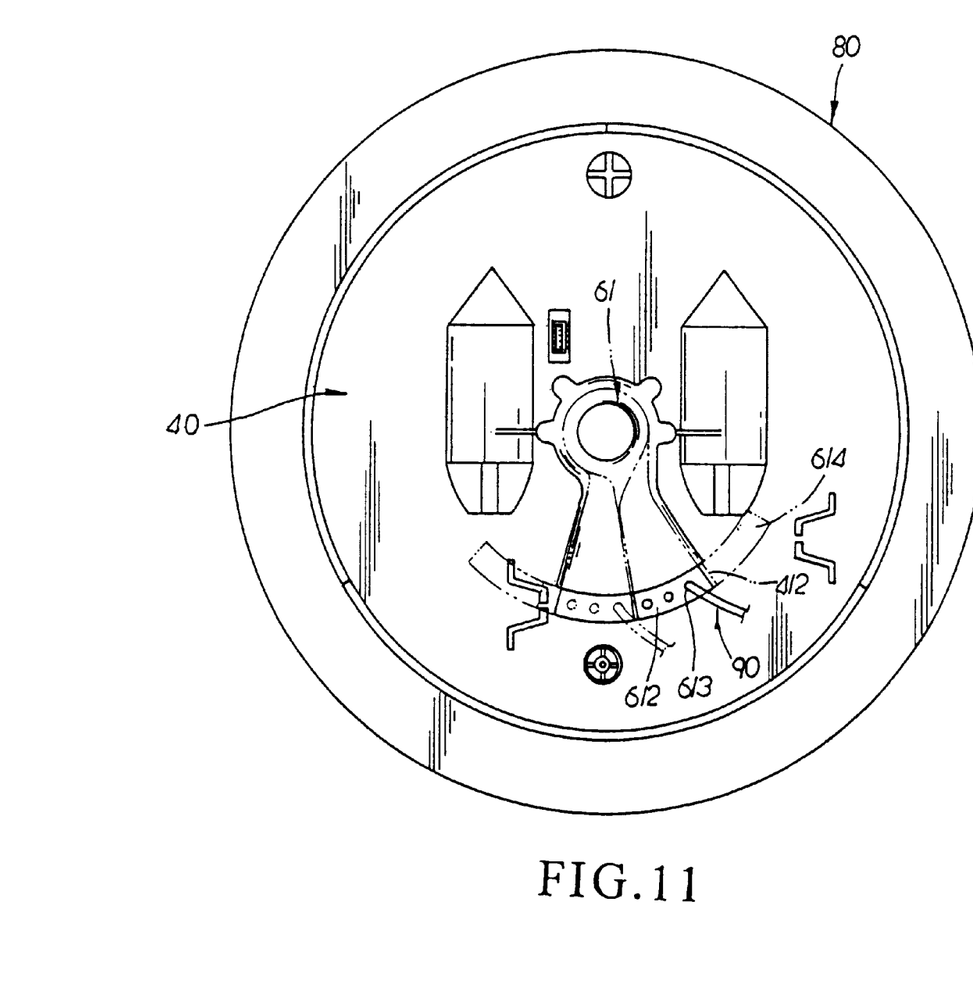
FIG. 11 is diagram showing the adjustment operation of the second embodiment.

To adjust the positions of the linkage pieces 60 to obtain various kinds of braking resistance, as shown in FIG. 11 The motor 74' is activated to make the main transmission means 72', the secondary transmission means 73' and the linkage means 76' to rotate in synchronism, causing the driving means 77' engaged with the linkage means 76' via the restraint means 75' to spin synchronically. As the driving means rotates, the pull cord 90 is pulled to makes the pull cord control mount 61 to slide in synchronism in the slide slot 412. Such a movement of the pull cord control mount 61 results-in the gear teeth 615 of the rack gear 614 meshing with the driving gear 77 which in turn drives the linkage pieces 60 as a result of the engagement of the lower normal gear 772 of the driving gear 77 with the gear teeth 605 of the linkage pieces 60 so as to make the linkage pieces 60 pivot in synchronism, resulting in the variation of the distance between the magnets 601 and the flywheel 80.

It can be apparently seen that the present invention has the following advantages in practical operation:
The adjustment of the magnetically operated wheel is effected by way of the motor 71 which drives in synchronism all the related components to vary the position of the linkage pieces 60 in a stageless manner. Besides, the torque restraining device and the application of the lever effect can secure the operation and increase the applied mechanical force and decrease the resistance. Even the malfunction of the microchip will endanger the normal operation of the present invention.

I claim:

1. A control mechanism for use in a magnetically operated wheel, comprising:

an outer cover, an inner housing, two compression springs, two small supporting wheels, two pivotal linkage pieces, an externally connected pull cord control mount, a sensor, a signal transmitter seat and a transmission set wherein said pivotal linkage pieces are equipped with a plurality of magnets that produce various braking resistance against said magnetically operated wheel as a distance between said pivotal linkage pieces and said magnetically operated wheel is adjustably varied;

wherein said outer cover is removably engaged with said inner housing;

said pivotal linkage pieces are pivotally secured to said inner housing;

said inner housing in combination with said outer cover is housed in said magnetically operated flywheel;

a motor having a geared transmission shaft is housed in said inner housing;

said transmission set includes a main transmission means, a minor transmission means, a linkage means, a restraint means and a driving gear;

said geared transmission shaft of said motor is rotatably engaged with said main transmission means which is rotatably mounted onto said inner housing;

said main transmission means is further in rotary engagement with said minor transmission means which is rotatably mounted onto said inner housing;

said minor transmission means is in rotary engagement with said linkage means;

said linkage means, said driving gear and said restraint means are integrally fixed together and rotatably mounted onto said inner housing;

said pull cord control mount has a plurality of cord holes and a rack gear in engagement with said driving gear; and both said pivotal linkage pieces have at a bottom end, opposite to a top pivot point, an extended rack gear engaged with said driving gear respectively whereby said pivotal linkage pieces can be pivotally adjusted of their positions with respect to said flywheel when said motor is actuated in either direction to vary magnetic force produced by said magnets and applied to said flywheel, resulting in variation of braking resistance against said flywheel.

2. The control mechanism as claimed in claim 1, wherein said transmission set is disposed outside said flywheel and is in connection to said externally connected pull cord mount by a pull cord; said pull cord mount is in engagement with said driving gear which is in turn in driving engagement with said linkage pieces so as to permit said linkage pieces to be pivotally operated to vary the distance between said linkage pieces and said flywheel; said linkage pieces are retractably actuated by springs mounted onto said inner housing whereby said linkage pieces are controlled by said external transmission set; wherein said external transmission set comprises a housing case, four stuff-in blocks, a main transmission means, a minor transmission means, a motor, a restraint means, a linkage means, a driving means, an external cover and a sensor; said motor is engaged with said main transmission means which meshes with said linkage means integrally combined with said driving means and said restraint means; and said driving means is connected to a pull cord whereby as said motor is activated, said linkage pieces can be pivoted in adjustment by said pull cord.

3. The control mechanism as claimed in claim 1, wherein said restraint means has a plurality of spring biased retraining units that are engaged with limiting grooves defined on an inner wall of said linkage means.

4. The control mechanism as claimed in claim 2, wherein said restraint means has a plurality of spring biased retraining units that are engaged with limiting grooves defined on an inner wall of said linkage means.

* * * * *